2,900,253

NICKEL BASE BRAZING ALLOYS FOR HIGH-TEMPERATURE APPLICATIONS

Robert M. Evans and Harry E. Pattee, Columbus, Ohio, assignors, by mesne assignments, to The Trane Company, La Crosse, Wis., a corporation of Wisconsin No Drawing. Application February 26, 1958
Serial No. 717,559

6 Claims. (Cl. 75—171)

This invention relates to brazing alloys which are to be used at high temperatures where oxidation resistance and strength are particularly important. More particularly these new brazing alloys are useful for brazing such metallic materials as high-alloy steels, stainless steels, nickel-chromium alloys, etc.

When joining metallic materials of construction for use at high temperatures, especially if the metals being joined have very thin sections, considerable difficulty is encountered in producing suitable articles which are useful above 1000° F. Some brazing alloys, such as known nickel-base alloys, are unsuitable for such applications because some of the constituents of the alloy diffuse into the grain boundaries of the parent metal, thus causing embrittlement and early failure in the joint area. This condition is aggravated in those alloys having a wide melting range. Other brazing alloys, such as known silver-base alloys, which do not react with the parent metal during brazing, are not suitable for use above 1000° F. in ordinary hot air atmospheres because the interface between the brazing filler-metal alloy and the parent metal rapidly oxidizes, thus rendering the joined article useless.

One object of this invention is to provide brazing filler-metal alloys which have oxidation resistance at temperatures above 1000° F. which is equal to, or better than, the metal being joined. More importantly, the new brazing alloys accomplish the joining of the metal and permit use of the brazing metal without serious impairment of the physical properties of the base metal at, or near, the braze.

In the assembling of complex structures made from stainless steel, the inventors have found that alloys with compositions such as are given in Table 1 produce well-bonded assemblies which have excellent oxidation resistance at temperatures at least up to 1400° F. In addition, if these alloys are properly used at temperatures slightly above their melting ranges, very little attack of the stainless steel occurs in the form of intergranular embrittlement or excessive alloying. Such improvements are more noticeable in the structures utilizing the thinner sections of metal, such as stainless steel of 0.005-inch thickness or thinner.

Table 1

| Alloy Number | Composition, weight percent | | | | Melting Range, F. |
|---|---|---|---|---|---|
| | Nickel | Tin | Cobalt | Chromium | |
| 5 | 64 | 30 | 6 | | 2,020–2,030 |
| 28 | 59 | 35 | 6 | | 2,020–2,040 |
| 29 | 63 | 29 | 8 | | 2,020–2,030 |
| 39 | 63 | 29 | 4 | 4 | 2,010–2,050 |

These alloys may be made by any conventional method and preferably by a method which permits subsequent disintegration into the powder form in which they are used. A preferred method of making the powdered alloy involves melting of the essentially pure metal constituents in the following order: nickel first, followed by the addition of the other more easily oxidized, lower melting constituents in a graphite or clay-graphite crucible. After melting in an induction furnace and stirring quickly, the molten alloy is poured into a high-pressure water jet and the resultant disintegrated metal is caught in a tank along with the water. After drying and screening, the brazing alloy powder is ready for use. The particular mesh sizes of the disintegrated brazing alloy may be varied by suitable selection of the disintegration process and may be selected according to the particular application to which the brazing alloy is applied.

These new alloys may be applied to the area to be joined before actual brazing by any conventional means. Some of these methods are painting, spraying, dipping, or extrusion. In each of these methods, the powdered alloy is mixed with or suspended in a suitable carrier, such as an organic solvent, or a synthetic rubber, or other carriers well known in the art. The properties of the carriers must be such that they do not interfere with the brazing operation. Brazing of metal preferably should be done in a highly reducing atmosphere such as dry hydrogen, or in a vacuum, but the brazing of heavy sections of metal may be accomplished in a highly protective atmosphere, if desired.

A specific example of the results obtained when Alloy No. 5, Table 1, was used to join 0.003-inch A.I.S.I. Type 347 Stainless Steel to 0.005-inch A.I.S.I. Type 347 Stainless Steel illustrates the utility and advantages of our invention. The powdered alloy was suspended in a mixture of benzene and synthetic rubber to make a paste with the consistency of soft putty. The paste was then applied to the joint area and the assembly was brazed in dry hydrogen at 2050° F. for 5 minutes. Metallographic examination of a first part of the resultant joints indicated no embrittling intergranular penetration of the stainless steel and very little interaction between the brazing alloy and the stainless steel. A second part of the same sample was exposed to a moving air stream at 1300° F. for 400 hours and again examined metallographically. The brazed joint was intact, and the fillet surface showed no more effect from oxidation than the stainless steel.

Each of the alloys of Table 1 were utilized in a manner similar to the aforesaid Alloy No. 5 to braze metallic materials. Similar improvements and advantages were noted with the use of these other alloys embodied in Table 1.

In making these new brazing alloys, it is within the scope of the invention that the nickel content may be varied from 58 to 68 percent, the tin content from 25 to 40 percent, and the cobalt content from 3 to 10 percent. It is also within the scope of the invention to have a nickel content of about 63 percent, a tin content of about 29 percent, and to vary the cobalt content from 4 to 8 percent. However, for best results the nickel-to-tin ratio should range between 1.7 to 1 and 2.2 to 1. The cobalt content may range between 3 and 10 percent, but the oxidation resistance decreases with decreasing cobalt content. Other conventional alloying element may be present in these alloys in minor amounts, provided the nickel, tin, and cobalt are present in the aforesaid amounts. For example, chromium may be added to these alloys for improved oxidation resistance and less stainless steel interaction. The addition of chromium is not necessary to the usefulness of these alloys, and when it is used some sacrifice in narrow melting range must be tolerated. The compositions within the ranges given in Table 1 are preferred.

What we claim:
1. An alloy for brazing for use at high temperatures consisting essentially of 58 to 68 percent nickel, 25 to 40 percent tin, 3 to 10 percent cobalt.

2. An alloy for brazing for use at high temperatures consisting essentially of 59 to 64 percent nickel, 29 to 35 percent tin, 4 to 8 percent cobalt.

3. An alloy for brazing for use at high temperatures consisting essentially of about 63 percent nickel, 29 percent tin, 4 to 8 percent cobalt.

4. An alloy for brazing consisting essentially of about 64 percent nickel, about 30 percent tin, about 6 percent cobalt.

5. An alloy for brazing for use at high temperatures consisting essentially of about 59 percent nickel, about 35 percent tin, about 6 percent cobalt.

6. An alloy for brazing for use at high temperatures consisting essentially of 63 percent nickel, about 29 percent tin, about 4 percent cobalt, about 4 percent chromium.

References Cited in the file of this patent
UNITED STATES PATENTS 2,403,926    Johnson _____ July 16, 1946

OTHER REFERENCES

"Handbuch aller Legierungen" (Janecke), 2nd ed., pp. 536–537; publ. by Carl Winter, University Press, Heidelberg, 1949.